3,389,331
DEVICE FOR ELECTROMAGNETIC EXPLORATION WITH THE HELP OF A NATURAL FIELD
Vladimir Iljich Vexler, Varshavskoje Shaussee 176, Korp. 5, Apt. 73, Moscow, U.S.S.R.
Filed Aug. 3, 1965, Ser. No. 476,824
7 Claims. (Cl. 324—8)

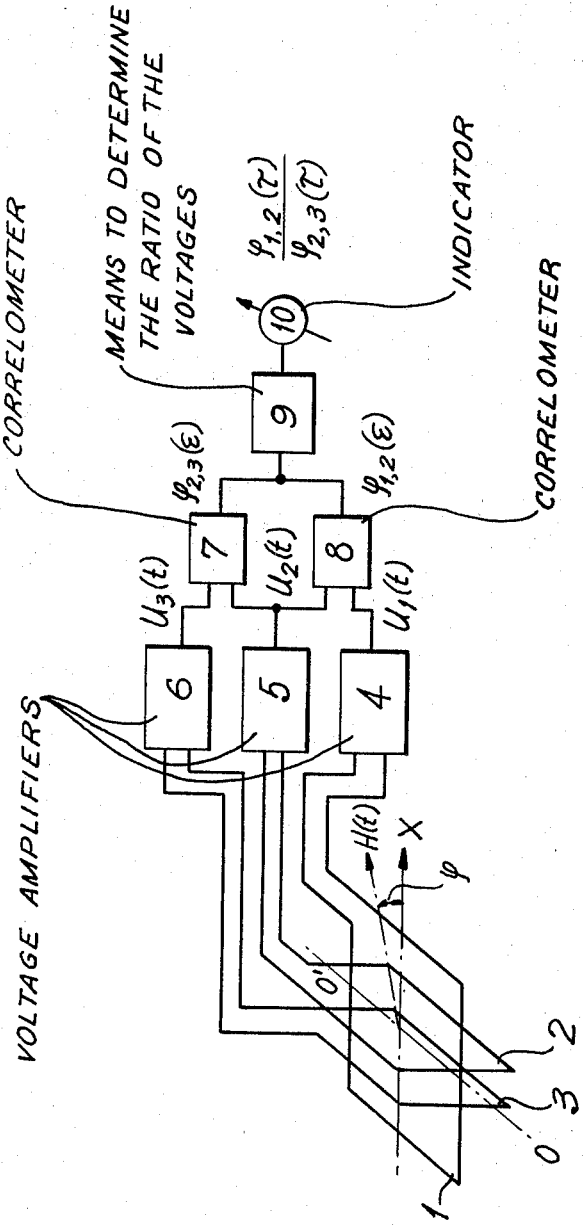

ABSTRACT OF THE DISCLOSURE

A device for measuring the natural magnetic earth field at subsonic and sonic frequencies in exploring electrically conductive ore bodies and geological mapping. Noise-proofness of the measurements is enhanced by the application of an additional field pickup and also by connection of correlometers in the electric circuit of the device.

---

The present invention relates to devices for measuring the inclination of the plane of the ellipse of polarization of the variable magnetic field of infrasound and sound frequencies employed for the exploration of ore bodies having good electric conductivity.

It is known that the plane of the ellipse of polarization of a natural variable magnetic field is usually horizontal, while near ore bodies the plane of the ellipse of polarization becomes somewhat inclined to the horizon due to an induced magnetic field, this being an evidence of the presence of an ore body.

The use of ellipses in geophysical prospecting appears in U.S. Patent 2,586,667 and U.S. Patent 3,188,559. The plane referred to herein is a reference plane and is the plane of that ellipse which would be horizontal in the absence of a disturbing presence such as of an ore body. Such planes are well known in the field of prospecting and various devices are known for measuring the inclination of the same.

Hitherto known devices for measuring the inclination of the plane of the ellipse of polarization of the variable magnetic field have two receiving frames (here and hereafter conventional sensors of magnetic field are referred to as receiving frames), the planes of whose coils are inclined at an angle of 45° towards the horizon, the frames being normal to each other. However, such known devices do not provide for measuring the inclination of the plane of the ellipse in case of a weak magnetic field, i.e., when the amplitude of the induced voltage is less than that of the noises inherent to the device. This disadvantage limits the application of the device known in the art since in certain areas and seasons the value of the amplitude of the variable natural magnetic field is so small that measurements with the necessary accuracy become impracticable.

It is an object of the present invention to eliminate said disadvantages.

The primary object of the invention is to create a device which would make it possible to measure the inclination of the plane of the ellipse of polarization of the natural variable magnetic field under conditions when voltages induced by the variable magnetic field in the receiving frames are many times as small as the voltage of the noises inherent to the device.

Said primary object is attained by the fact that in the device according to the present invention the sensors of magnetic field are arranged so that the vector of the magnetic moment of one sensor should be horizontal and the vector of the magnetic moment of another sensor should be vertical. In addition to that a third sensor of magnetic field is employed, whose magnetic moment vector is parallel to that of the first sensor. For measuring the cross-correlation function of the output signals of the first and third sensors a special instrument is connected to their outputs, while at the output of the third and any one of the first two sensors another instrument is connected for measuring the cross-correlation function of their output signals. A special amplifier can be cut in between each sensor and its respective instrument measuring the cross-correlation function.

Multi-coil magnetic frames are employed as sensors of the magnetic field.

The invention is further explained in accordance with its exemplary embodiment given by way of illustration with due reference to the accompanying drawing in which the key diagram of the device is shown.

The instrument for measuring cross-correlation function is a correlometer.

The device according to the present invention comprises three receiving frames, one of which shown at 1 has coils arranged in the horizontal plane. The planes of the coils of two other frames 2 and 3 are vertical and parallel to each other. The orientation of the planes of the coils of frames 2 and 3 with respect to the four cardinal points or to the profile of observations X is assumed to be known.

Each frame is connected to the input of a corresponding voltage amplifier 4, 5 and 6. By means of two correlometers 7 and 8 the cross-correlation function of the output voltages of the amplifiers versus time is determined. Correlometer 7 measures the cross-correlation function of voltages at the outputs of amplifiers 5 and 6, and correlometer 8 measures the cross-correlation function of voltages at the outputs of amplifiers 4 and 5, as an alternative to the illustrated connections, a connection could be made between correlometer 8 and amplifier 6 so that a determination could be made of the cross-correlation function between amplifiers 4 and 6. The ratio of cross-correlation functions at the outputs of correlometers 7 and 8 is a single-valued function of the measured angle of inclination of the plane of the ellipse of polarization of the natural variable magnetic field.

The operation principle of the device proposed herein can be explained as follows.

Let us denote the voltages at the outputs of amplifiers 4, 5 and 6 by $U_1(t)$, $U_2(t)$ and $U_3(t)$, respectively.

These voltages are random functions of time $t$ and each of them is a sum of the noise voltage and the voltage, induced in the frame by the magnetic field and amplified by the amplifier.

Thus we have $$U_1(t) = U_{1\text{noise}}(t) + K_1 \times U_{1m}(t)$$
$$U_2(t) = U_{2\text{noise}}(t) + K_2 \times U_{2m}(t) \quad\quad (a)$$
$$U_3(t) = U_{3\text{noise}}(t) + K_3 \times U_{3m}(t)$$

where $U_{1\text{noise}}(t)$, $U_{2\text{noise}}(t)$ and $U_{3\text{noise}}(t)$ are noise voltages at the outputs of amplifiers 4, 5 and 6; $U_{1m}(t)$, $U_{2m}(t)$ and $U_{3m}(t)$ are voltages induced by the magnetic field in receiving frames 1, 2 and 3; $K_1$, $K_2$ and $K_3$ are voltage amplification factors of amplifiers 4, 5 and 6, respectively.

If the component of the intensity vector $H(t)$ of the variable magnetic field is directed normally to the line of intersection of frames 1 and 2, then $$U_{1m}(t) = S_1 H(t) \sin \varphi$$
$$U_{2m}(t) = S_2 H(t) \cos \varphi \quad\quad (b)$$
$$U_{3m}(t) = S_3 H(t) \cos \varphi$$

where $S_1$, $S_2$ and $S_3$ are values, determining the sensitivity of frames 1, 2 and 3, respectively, to the magnetic field; $\varphi$ is the angle of inclination of the plane of the ellipse of polarization of the magnetic field to the horizontal or, as shown in the drawing, is the angle between said plane and the 00' axis.

Having introduced the obtained values of $U_{1m}(t)$, $U_{2m}(t)$, $U_{3m}(t)$ into the previously derived relations (a), we shall have $$U_1(t) = U_{1\text{noise}}(t) + K_1 S_1 H(t) \sin \varphi$$
$$U_2(t) = U_{2\text{noise}}(t) + K_2 S_2 H(t) \cos \varphi \quad \text{(c)}$$
$$U_3(t) = U_{3\text{noise}}(t) + K_3 S_3 H(t) \cos \varphi$$

Correlometer 7 measures the cross-correlation function of voltages $U_2(t)$ and $U_3(t)$. By definition of the cross-correlation function $\varphi(\tau)$ we have $$\varphi_{2,3}(\tau) = \lim_{T \to \infty} \frac{1}{2T} \int_{-T}^{+T} U_2(t) U_3(t+\tau) dt$$

As the average values of noise voltages $U_{2\text{noise}}(t)$ and $U_{3\text{noise}}(t)$ are equal to zero and these voltages are mutually dependent in time, i.e., they are non-coherent and independent of voltages induced by the magnetic field, then, by virtue of the known property of the cross-correlation function (b), with the time interval T being sufficiently great, we obtain $$\varphi_{2,3}(\tau) \approx K_2 \cdot K_3 \cdot S_2 \cdot S_3 \lim_{T \to \infty} \int_{-T}^{+T} H(t) H(t+\tau) dt =$$
$$= K_2 \cdot K_3 \cdot S_2 \cdot S_3 \cos^2 \varphi \varphi(\tau) \quad \text{(d)}$$

where $\varphi(\tau)$ is the autocorrelation function of the amplitude of variable magnetic field $H(t)$. Similarly, the cross-correlation function of voltages $U_1(t)$ and $U_2(t)$ is equal to $$\varphi_{1,2}(\tau) = K_1 \cdot K_2 \cdot S_1 \cdot S_2 \sin \varphi \cos \varphi \varphi(\tau) \quad \text{(e)}$$

From the above relations it follows that $$\varphi = \arctan \frac{K_3 S_3}{K_1 S_1} \cdot \frac{\varphi_{1,2}(\tau)}{\varphi_{2,3}(\tau)}$$

i.e. the inclination of the plane of the ellipse of polarization of magnetic field is univocally determined by the ratio of cross-correlation functions.

What is claimed is:

1. A device for measuring the inclination of the plane of the ellipse of polarization of a natural variable magnetic field comprising a first sensor of said magnetic field, a second sensor of said magnetic field; the magnetic moment vectors of said two sensors being normal to each other, said sensors being mounted so that the magnetic moment vector of said first sensor is horizontal and the magnetic moment vector of said second sensor is vertical in the absence of a body of ore; a third sensor, whose magnetic moment vector is parallel to that of said first sensor; means, connected to the outputs of said first and third sensors for measuring the cross-correlation function of the output signals thereof; and further means connected to the output of said second sensor and to the output of one of the other two sensors for measuring the cross-correlation function of the output signals thereof, said functions indicating the inclination of said plane to the horizontal.

2. A device for measuring the inclination of the plane of the ellipse of polarization of a natural variable magnetic field comprising a first sensor of said magnetic field, a second sensor of said magnetic field, the magnetic moment vectors of said two sensors being normal to each other, said sensors being mounted so that the magnetic moment vector of said first sensor is horizontal and the magnetic moment vector of said second sensor is vertical; a third sensor whose magnetic moment vector is parallel to that of said first sensor; means connected to the outputs of said first and third sensors for measuring the cross-correlation function of the output signals thereof; further means, connected to the output of said second sensor and to the output of one of the other two sensors for measuring the cross-correlation function of the output signals thereof; and amplifier means connected between each one of said sensors and one of the first two said means for measuring the cross-correlation function.

3. A device as claimed in claim 1, in which multicoil magnetic frames constitute the sensors.

4. A device as claimed in claim 2, in which multicoil magnetic frames constitute the sensors.

5. A device for electromagnetic exploration with the help of the natural field, comprising: a first magnetic field pickup, a second magnetic field pickup disposed so that its magnetic moment vector is normal to the magnetic moment vector of said first pickup, a third magnetic field pickup, a second magnetic field pickup disposed so that its parallel to the magnetic moment vector of said first pickup; an instrument for measuring the cross-correlation function of the signals from said first and second pickups, said instrument being connected to the output of said first and second pickups; a second instrument for measuring the cross-correlation function of the signals from said first and third pickups, said second instrument being connected to the output of said first and third pickups; means for measuring the ratio of the output signal from said first instrument for measuring the cross-correlation function to the output signal from said second instrument for measuring the cross-correlation function, said means being connected to the outputs of said first and second instruments for measuring the cross-correlation functions.

6. A device for electromagnetic exploration with the help of the natural field as claimed in claim 5, wherein the outputs of said magnetic field pickups are connected to respective amplifiers for each of said pickups, the outputs of the first and second amplifiers being connected to the input of the first instrument for measuring the cross-correlation function, and the outputs of the first and third amplifiers being connected to the input of the second instrument for measuring the cross-correlation function.

7. A device for electromagnetic exploration with the help of the natural field as claimed in claim 5, wherein each of the magnetic field pickups is a multiple-turn coil.

References Cited
UNITED STATES PATENTS

| | | | |
|---|---|---|---|
| 2,955,250 | 10/1960 | Shaw et al. | 324—4 |
| 3,126,510 | 3/1964 | McLaughlin et al. | 324—47 X |
| 3,149,278 | 9/1964 | Cartier et al. | 324—7 |
| 3,188,559 | 6/1965 | Yungul | 324—1 |
| 3,290,590 | 12/1966 | Baker | 324—68 |

RUDOLPH V. ROLINEC, *Primary Examiner.*

WALTER L. CARLSON, *Examiner.*

G. R. STRECKER, *Assistant Examiner.*